(12) United States Patent
Horvitz et al.

(10) Patent No.: US 7,249,159 B1
(45) Date of Patent: Jul. 24, 2007

(54) NOTIFICATION PLATFORM ARCHITECTURE

(75) Inventors: Eric J. Horvitz, Kirkland, WA (US); David O. Hovel, Bellevue, WA (US); Carl M. Kadie, Bellevue, WA (US); Andrew W. Jacobs, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 708 days.

(21) Appl. No.: 09/596,365

(22) Filed: Jun. 17, 2000

Related U.S. Application Data

(60) Provisional application No. 60/189,801, filed on Mar. 16, 2000.

(51) Int. Cl.
*G06F 15/16* (2006.01)
(52) U.S. Cl. ....................... 709/206; 709/229
(58) Field of Classification Search ................ 709/206, 709/225, 318, 229, 228, 226, 207; 379/201.02, 379/201.03, 211.3
See application file for complete search history.

(56) References Cited

U.S. PATENT DOCUMENTS

| | | | | |
|---|---|---|---|---|
| 5,742,905 | A * | 4/1998 | Pepe et al. ................... | 455/461 |
| 5,864,848 | A | 1/1999 | Horvitz | |
| 6,021,403 | A | 2/2000 | Horvitz | |
| 6,466,232 | B1 * | 10/2002 | Newell et al. ............... | 345/700 |
| 6,505,167 | B1 * | 1/2003 | Horvitz et al. ................. | 705/9 |
| 6,571,279 | B1 * | 5/2003 | Herz et al. .................. | 709/217 |
| 6,618,716 | B1 * | 9/2003 | Horvitz ........................ | 706/55 |
| 6,622,160 | B1 * | 9/2003 | Horvitz ....................... | 709/206 |
| 6,714,967 | B1 * | 3/2004 | Horvitz ....................... | 709/206 |
| 6,931,434 | B1 * | 8/2005 | Donoho et al. ............. | 709/207 |
| 2002/0046299 | A1 * | 4/2002 | Lefeber et al. ............. | 709/318 |
| 2002/0078204 | A1 | 6/2002 | Newell et al. | |
| 2002/0080156 | A1 | 6/2002 | Abbott et al. | |
| 2002/0083158 | A1 | 6/2002 | Abbott et al. | |
| 2002/0099817 | A1 | 7/2002 | Abbott et al. | |
| 2003/0154476 | A1 | 8/2003 | Abbott, III, et al. | |
| 2004/0193444 | A1 * | 9/2004 | Hufford et al. ................ | 705/1 |
| 2005/0013417 | A1 * | 1/2005 | Zimmers et al. ............. | 379/37 |

FOREIGN PATENT DOCUMENTS

WO     WO 9800787     1/1998

OTHER PUBLICATIONS

Helm, Improbable Inspiration, Oct. 1996, Los Angles Times.*
Horvitz, Agents with Beliefs: Reflections on Bayesian Methods for User Modeling, Jun. 5, 1997, 6th International Conference on User Modeling.*

(Continued)

*Primary Examiner*—Larry D. Donaghue
(74) *Attorney, Agent, or Firm*—Amin, Turocy, & Calvin, LLP

(57) ABSTRACT

An architecture for a notification platform is disclosed. In one embodiment, the architecture includes a user mechanism, one or more notification sources and sinks, and a notification manager. The user mechanism stores information regarding notification parameters of a user, such as the user's default notification preferences, and may also contain, access, and/or infer contextual information. Each notification source generates notifications intended for the user, while each notification sink can provide the notifications to the user. Notification sources and sinks provide information via standardized notification schema. The notification manager is designed to appropriately convey the notifications generated by the sources to the sinks, based on information provided by the user mechanism, and by the sources and sinks. As disclosed, the architecture is applicable to entities other users as well.

28 Claims, 5 Drawing Sheets

OTHER PUBLICATIONS

Birnbaum et al., Compelling Intelligent User Interfaces- How much AI?, pp. 173-175, ACM.*
Cohen, Learning Rules that Classify E-mail, 1996.*
Macskassy et al. EmailValet: Learning Email Preferences for Wireless Platforms, Jun. 3, 1999.*
Macskassy et al. EmailValet: Learning User Preferences for Wieless Email, 1999.*
U.S. Appl. No. 09/007,894, filed Jan. 15, 1998, Horvitz.
U.S. Appl. No. 09/055,477, filed Apr. 6, 1998.
U.S. Appl. No. 09/364,522, filed Jul. 30, 1999, Horvitz.
U.S. Appl. No. 09/364,528, filed Jul. 30, 1999, Horvitz.
U.S. Appl. No. 09/365,293, filed Jul. 30, 1999, Horvitz.
U.S. Appl. No. 09/365,287, filed Jul. 30, 1999, Horvitz.
U.S. Appl. No. 09/364,527, filed Jul. 30, 1999, Horvitz.
M. Sahami et al, (1998), A Bayesian approach to filtering junk email, in Workshop on learning for text categorizations, AAAI Technical Report WS-98-05, AAAI.
D. Koller er al, (1996), Toward optimal feature selection, in proceedings of $13^{th}$ conference on machine learning, pp. 284-292, Morgan Kaufmann, San Francisco.
E. Horvitz et al, (1998) The Lumiere project, Bayesian user modeling for inferring the goals and needs of software users, in proceedings of the $14^{th}$ conf on uncertainty in AI, pp. 256-265, Morgan Kaufmann, San Francisco.
J. Platt (1999), Probabilistic outputs for support vector machines and comparisons to regularized likelihood methods, in Advances in Large Margin Classifiers, MIT Press, Cambridge, MA.
H. Lieberman (1995), Letizia, An agent that assists web browsing, in proceedings of IJCAI-95, Montreal Canada, Morgan Kaufmann, San Francisco.
Horvitz et al, (1995) Display of information for time-critical decision making, in proceedings of the $11^{th}$ conf on uncertainty in AI, pp. 296-305, Monetrea, Canada.
M. Czerwinski et al (1999), Visualizing implicit queries for information management and retrieval, in proceedings of CHI'99, ACM SIGCHI Conf on informational and knowledge management, pp. 560-567, ACM.
S. Dumais et al (1998), Inductive learning algorithms and representations for text categorization, in Proceedings of $7^{th}$ Intl Conf on Information and Knowledge Management, pp. 148-155, ACM.
Platt (1999), Fast training of support vector machines using sequential minimal optimization, in advances in kernel methods, support vector learning, MIT Press, Cambridge, MA.
Horvitz (1999), Principles of mixed-initiative user interfaces, in Proceedings of CHI'99, ACM SIGCHI Conf on Human Factors in Computing Systems, Pittsburgh, PA, 159-166, ACM.
Breese et al (1998) Empirical analysis of predictive algorithms for collaborative filtering, in Proceedings of the $14^{th}$ conf on uncertainty in AI, pp. 43-52, AUAI, Morgan Kaufmann, San Francisco.
Horvitz, Rutledge (1991), Time dependent utility and action under uncertainty, in proceedings of $7^{th}$ conf on uncertainty in AI, LA, CA, pp. 151-158, Morgan Kaufmann, San Francisco.
Horvitz, Seivier (1977), Time-critical action: representations and application, in proceedings of the $13^{th}$ conf on uncertainty in AI (UAI-97), pp. 250-257, Providence, RI, Morgan Kaufmann, San Francisco.
Andy Harter, et al., A Distributed Location System for the Active Office, IEEE Network, 1994, pp. 62-70.
Guanling Chen, et al., A Survey of Context-Aware Mobile Computing Research, Dartmouth Computer Science Technical Report, 2000, 16 pages.
William Noah Schilt, A System Architecture for Context-Aware Mobile Computing, Columbia University, 1995, 153 pages.
Mike Spreitzer, et al., Providing Location Information in a Ubiquitous Computing Environment, SIGOPS '93, 1993, pp. 270-283.
Marvin Theimer, et al., Operating System Issues for PDAs, In Fourth Workshop on Workstation Operating Systems, 1993, 7 pages.
Roy Want, Active Badges and Personal Interactive Computing Objects, IEEE Transactions on Consumer Electronics, 1992, 11 pages, vol. 38 - No. 1.
Bill N. Schilit, et al., The ParcTab Mobile Computing System, IEEE WWOS-IV, 1993, 4 pages.
Bill Schilit, et al., Context-Aware Computing Applications, In Proceedings of the Workshop on Mobile Computing Systems and Applications, Dec. 1994. pp. 85-90.
Bill N. Schilit, et al., Customizing Mobile Applications, Proceedings USENIX Symposium on Mobile and Location Independent Computing, Aug. 1993, 9 pages.
Mike Spreitzer, et al., Architectural Considerations for Scalable, Secure, Mobile Computing with Location Information, In The 14th International Conference on Distributed Computing Systems, Jun. 1994, pp. 29-38.
Mike Spreitzer, et al., Scalable, Secure, Mobile Computing with Location Information, Commmunications of the ACM, Jul. 1993, 1 page, vol. 36 - No. 7.
Roy Want, et al., The Active Badge Location System, ACM Transactions on Information Systems, Jan. 1992, pp. 91-102, vol. 10 - No. 1.
Mark Weiser, Some Computer Science Issues in Ubiquitous Computing, Communications of the ACM, Jul. 1993, pp. 75-84, vol. 36 - No. 7.
M. Billinghurst, et al., An Evelution of Wearable Information Spaces, Proceedings of the Virtual Reality Annual International Symposium, 1998, 8 pages.
Bradley J. Rhodes, Remembrance Agent: A continuously running automated information retrieval system, The Proceedings of The First International Conference on The Practical Application Of Intelligent Agents and Multi Agent Technology, 1996, pp. 487-495.
Eric Horvitz, et al., In Pursuit of Effective Handsfree Decision Support: Coupling Bayesian Inference, Speech Understanding, and User Models, 1995, 8 pages.
Bradley J. Rhodes, The Wearable Remembrance Agent: A System for Augmented Theory, The Proceedings of The First International Symposium on Wearable Computers, Oct. 1997, pp. 123-128.
Eric Horvitz, et al., Attention-Sensitive Alerting in Computing Systems, Microsoft Research, Aug. 1999.
Bill N. Schilit, et al., Disseminationg Active Map Information to Mobile Hosts, IEEE Network, 1994, pp. 22-32, vol. 8 - No. 5.
Mark Billinghurst, et al., Wearable Devices: New Ways to Manage Information, IEEE Computer Society, Jan. 1999, pp. 57-64.
Thad Eugene Starner, Wearable Computing and Contextual Awareness, Massachusetts Institute of Technology, Jun. 1999, 248 pages.
Bradley J. Rhodes, The Wearable Remembrance Agent: A System for Augmented Memory, Personal Technologies Journal Special Issue on Wearable Computing, 1997, 12 pages.
Workshop on Wearable Computing Systems, Aug. 19-21, 1996.
Mark Billinghurst, Research Directions in Wearable Computing, University of Washington, May, 1998, 48 pages.
Mark Weiser, The Computer for the 21st Century, Scientific American, Sep. 1991, 8 pages.
T. Joachims, Text categorization with support vector machines: learning with many relevant features, Machine Learning, European Conference on Machine Learning, Apr. 21, 1998, pp. 137-142.
International Search Report dated Sep. 29, 2003 for PCT Application Ser. No. 00/20685, 3 pages.
Robert M. Losee, Jr., Minimizing information overload: the ranking of electronic messages, Journal of Information Science 15, Elsevier Science Publishers B.V., 1989, pp. 179-189.

* cited by examiner

NOTIFICATION PLATFORM ARCHITECTURE

RELATED APPLICATIONS

The present application claims the benefit of the provisional patent application filed on Mar. 16, 2000, entitled "Attentional Systems and Interfaces," and assigned Ser. No. 60/189,801.

FIELD OF THE INVENTION

This invention relates generally to unified receipt and notification of alerts generated by varied devices and applications for conveyance to a user, and more particularly to an architecture for such unified context sensing and analysis, alert receipt, and notification.

BACKGROUND OF THE INVENTION

Many computer users today receive information from a number of different sources, and utilize a number of different devices in order to access this information. For example, a user may receive e-mail and instant messages over a computer, pages over a pager, voice-mail over a phone, such as a cellular ("cell") or landline phone, news information over the computer, etc. This makes it difficult for the user to receive all his or her different information wherever the user happens to be.

For example, a user may be away from his or her computer, but receive an important e-mail. The user may have access only to a cell phone or a pager, however. As another example, the user may be working on the computer, and have turned off the ringer and voice-mail indicator on the phone. When an important voice-mail is left, the user has no way of receiving this information on the computer.

Moreover, many of the alerts may not be important to the user—for example, an e-mail from the user's manager or co-worker should receive higher priority than the latest sports scores. More generally, the value of the information contained in an alert should be balanced with the costs associated with the disruption of the user by an alert. Both the costs and value may be context sensitive. Beyond notifications about communications, users are alerted with increasing numbers of services, error messages, and computerized offers for assistance.

The prior art, however, does not provide for alerts following the user, for the prioritization of the alerts, nor for considering the potentially context-sensitive value and costs associated with notifications. For these and other reasons, therefore, there is a need for the present invention.

SUMMARY OF THE INVENTION

This invention relates to the architecture for a notification platform. In one embodiment, the architecture includes a user mechanism, one or more notification sources and sinks, and a notification manager. The user mechanism is designed to both store user profile information regarding notification parameters of a user, such as the user's default notification preferences, and to provide a user context identification and updating service. Each notification source is designed to generate notifications intended for the user, while each notification sink is designed to provide the notifications to the user. The notification manager is designed to convey the notifications generated by the sources to the sinks, based on information stored by the user mechanism and on information provided or inferred about the urgencies of the notifications. For example, the notification manager can access or infer the context of the user (e.g., the user's current location and focus of attention). This can be done based on a consideration of multiple sources of information. Such sources of information can include the user's context profile, the user's online calendar, the time of day, events about the world, organization, system, and/or the user's activity. The notification can then determine through an analysis of the context and the urgency of the information which of the notifications should be conveyed to the user, via which of the sinks, and in which manner or modality provided by the sinks.

Embodiments of the invention provide for advantages. A user may, for example, receive e-mail alerts on a cell phone, or voice-mail on a desktop computer, as is determined appropriate by the notification manager. Thus, notifications from notification sources are passed to the notification manager, which determines whether the user should be notified. If the manager determines that the user should be notified, then the manager also determines how the user should be notified. This can be based on the information stored in the user profile, including such information as the user's preferences and current context, and notifies the appropriate notification sinks. The sinks can include, for example, a desktop computer, a cell phone, a pager, etc.

Furthermore, the methods and architecture of the notification platform generalize to any notification, including those associated with the potential provision of a service by a software component in a desktop or mobile setting. Such notifications include:

- alerts about services such as those that seek to automatically provide assistance or tips to a user working with a software application and/or automatically perform scheduling by examining e-mail at the focus of a user's attention;
- alerts that notify the user to upcoming appointments or engagements;
- alerts that relay important changes in the location, proximity, or attentional status of friends and colleagues; and,
- alerts that issue background queries based on text being composed or reviewed by users and present the results of such background searches to the user.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the present invention is defined only by the appended claims.

Example Computerized Device

Figure 1:
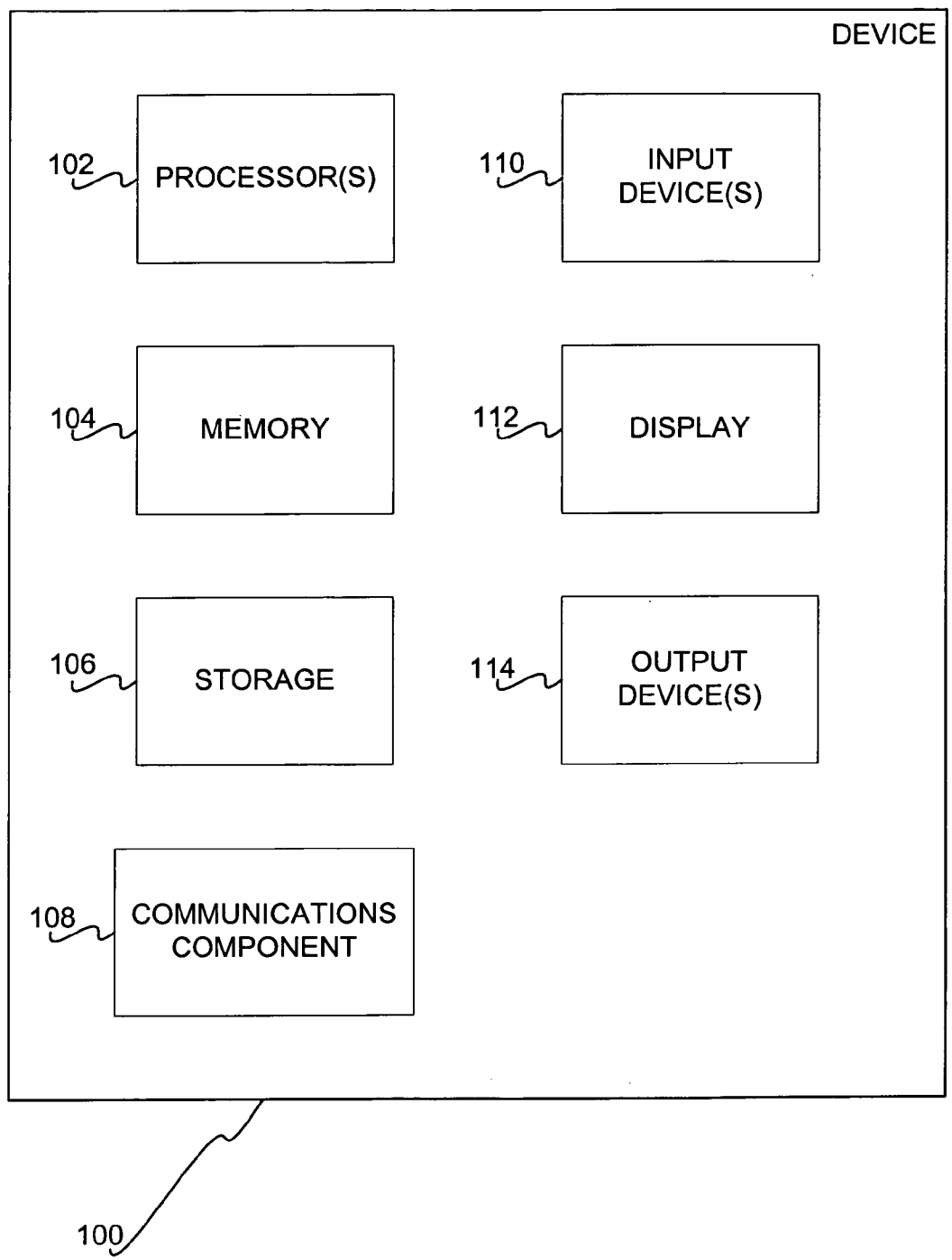
FIG. 1 is a diagram of an example computerized device in conjunction with which embodiments of the invention can be practiced.

Referring to FIG. 1, a diagram of an example computerized device 100 in conjunction with which embodiments of the invention may be practiced is shown. The example computerized device can be, for example, a desktop computer, a laptop computer, a personal digital assistant (PDA), a cell phone, etc.; the invention is not so limited. The description of FIG. 1 is intended to provide a brief, general description of a suitable computerized device in conjunction with which the invention may be implemented. Those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network.

The device 100 includes one or more of the following components: processor(s) 102, memory 104, storage 106, a communications component 108, input device(s) 110, a display 112, and output device(s) 114. It is noted, that for a particular instantiation of the device 100, one or more of these components may not be present. For example, a PDA may not have any output device(s) 114, while a cell phone may not have storage 106, etc. Thus, the description of the device 100 is to be used as an overview as to the types of components that typically reside within such a device 100, and is not meant as a limiting or exhaustive description of such computerized devices.

The processor(s) 102 may include a single central-processing unit (CPU), or a plurality of processing units, commonly referred to as a parallel processing environment. The memory 104 may include read only memory (ROM) 24 and/or random access memory (RAM) 25. The storage 106 may be any type of storage, such as fixed-media storage devices such as hard disk drives, flash or other non-volatile memory, as well as removable-media storage devices, such as tape drives, optical drives like CD-ROM's, floppy disk drives, etc. The storage and their associated computer-readable media provide non-volatile storage of computer-readable instructions, data structures, program modules, and other data. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used.

Because the device 100 may operate in a network environment, such as the Internet, intranets, extranets, local-area networks (LAN's), wide-area networks (WAN's), etc., a communications component 108 can be present in or attached to the device 100. Such a component 108 may be one or more of a network card, such as an Ethernet card, an analog modem, a cable modem, a digital subscriber loop (DSL) modem, an Integrated Services Digital Network (ISDN) adapter, etc.; the invention is not so limited. Furthermore, the input device(s) 110 are the mechanisms by which a user indicates input to the device 100. Such device(s) 110 include keyboards, pointing devices, microphones, joysticks, game pads, satellite dishes, scanners, etc. The display 112 is how the device 100 typically shows output to the user, and can include, for example, cathode-ray tube (CRT) display devices, flat-panel display (FPD) display devices, etc. In addition, the device 100 may indicate output to the user via other output device(s) 114, such as speakers, printers, etc.

Architecture

Figure 2:
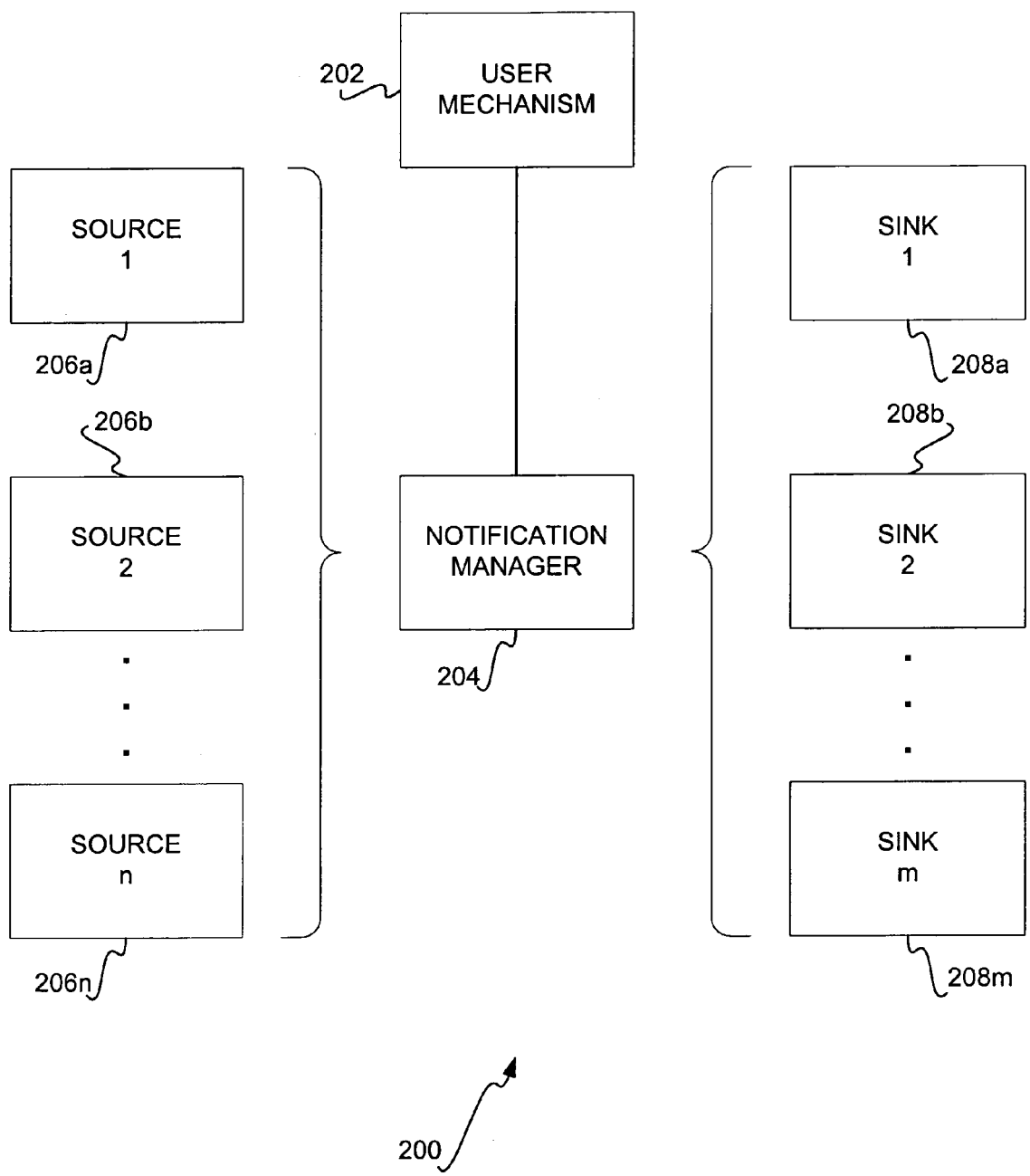
FIG. 2 is a diagram of a notification architecture according to an embodiment of the invention.

In this section of the detailed description, a notification architecture according to an embodiment of the invention is described, in conjunction with the diagram of FIG. 2. The architecture 200 of FIG. 2 includes a user mechanism 202, a notification manager 204 (also referred to as an event broker), a number of notification sources 206a, 206b, ..., 206n, and a number of notification sinks 208a, 208b, ..., 208m. The sources are also referred to as event publishers, while the sinks are also referred to as event subscribers. There can be any number of sinks and sources. In general, the notification manager 204 conveys notifications, which are also referred to as events or alerts, from the sources 206 to the sinks 208, based on information stored in the user mechanism 202. Each of the components of the architecture 200 of FIG. 2 is now described in turn.

The user mechanism 202 stores information regarding variables and parameters of a user that influence notification decision-making. For example, the parameters may include contextual information, such as the user's typical locations and attentional focus or activities per the time of day and the day of the week, and additional parameters conditioned on such parameters, such as the devices users tend to have in different locations. Such parameters may also be functions of observations made autonomously via one or more sensors. For example, profiles may be selected or modified based on information about a user's location as might be provided by a global positioning system (GPS) subsystem, on information about the type of device being used and/or the pattern of usage of the device, the last time a device of a particular type was accessed by the user, etc. Furthermore, as is described in more detail later in the application, automated inference may also be employed, to dynamically infer parameters such as location and attention. The profile parameters may be stored as a user profile that can be edited by the user. Beyond relying on sets of predefined profiles or dynamic inference, the notification architecture can also allow users to specify in real-time his or her state, such as the user not being available except for important notifications for the next x hours, or until a given time.

The parameters can also include default notification preference parameters regarding a user's preference as to being disturbed by notifications of different kinds in different settings, which can be used as the basis from which to make notification decisions by the notification manager 204, and to the basis upon which a particular user can make changes. The parameters may include default parameters as to how the user wishes to be notified in different situations, such as by cell phone, by pager, etc. The parameters can include such assessments as the costs of disruption associated with being alerted by different modes in different settings. That is, in one embodiment, the parameters can include contextual parameters indicating the likelihoods that the user is in different locations, the likelihoods that different devices are available, and the likelihoods of his or her attentional status at a given time, as well as notification parameters indicating how the user desires to be notified at a given time.

The information stored by the user mechanism 202 is in one embodiment inclusive of contextual information determined by the mechanism 202. The contextual information is determined by the mechanism 202 by discerning the user's location and attentional status based on one or more contextual information sources, as is described in more detail in a later section of the detailed description. The mechanism 202, for example, may be able to determine with precision the actual location of the user via a global positioning system (GPS) that is a part of a user's car, cell phone, etc. The mechanism 202 may also use a statistical model to determine the likelihood that the user is in a given state of attention by considering background assessments and/or observations gathered through considering such information as the type of day, the time of day, the data in the user's calendar, and observations about the user's activity. This is described in more detailed in the cofiled, copending and coassigned patent application entitled "Contextual Models and Methods for Inferring Attention and Location." Ser. No. 09/596,364 The given state of attention can include whether the user is open to receiving notification, busy and not open to receiving notification, etc. The type of day can include weekdays, weekends, holidays, etc.

Each of the sources 206a, 206b, . . . , 206n is able to generate notifications intended for the user. For example, the sources 206 may include communications, such as Internet and network-based communications, local desktop computer-based communications, and telephony communications, as well as software services, such as intelligent help, background queries, automated scheduling, etc. A notification source is defined generally herein as that which generates events, which can also be referred to as notifications and alerts, intended to alert a user, or a proxy for the user, about information, services, or a system or world event. A notification source can also be referred to as an event source.

For example, e-mail may be generated as notifications by an e-mail notification source such that it is prioritized, where the host application program generating the notification assigns the e-mail with a relative priority corresponding to the likely importance or urgency of the e-mail to the user. The e-mail may also be sent without regard to their relative importance to the user. Desktop-centric notifications can include an automated dialog with the goal of alerting a user to a potentially valuable service that he or she may wish to execute (e.g., scheduling from a message), information that the user may wish to review (e.g., derived from a background query), or errors and other alerts generated by a desktop computer. Internet-related services can include notifications including information that the user has subscribed to, such as headlines of current news every so often, stock quotes, etc.

Other notifications can include background queries (e.g., while the user is working, text that the user is currently working on may be reviewed, such that background queries regarding the text are formulated and issued to search engines), scheduling tasks from a scheduling or other program, etc. Notification sources 206 can themselves be push-type or pull-type sources. Push-type sources are those that automatically generate and send information without a corresponding request, such as headline news and other Internet-related services that send information automatically once subscribed to. Pull-type sources are those that send information in response to a request, such as e-mail being received after a mail server is polled. Still other notification sources include the following:

e-mail desktop applications such as calendar systems;
computer systems (e.g., that may alert the user with messages that information about alerts about system activity or problems);
Internet-related services, appointment information, scheduling queries;
changes in documents or numbers of certain kinds of documents in one or more shared folders;
availability of new documents in response to standing or persistent queries for information; and,
information sources for information about people and their presence, their change in location, their proximity (e.g., let me know when I am traveling if another employee of Microsoft is within 10 miles of me"), or their availability (e.g., let me know when Steve is available for a conversation and is near a high-speed link that can support full video teleconferencing").

Each of the notification sinks 208a, 208b, . . . , 208n is able to provide the notifications to the user. For example, such notification sinks 208 can include computers, such as desktop and/or laptop computers, handheld computers, cell phones, landline phones, pagers, automotive-based computers, etc. It is noted that some of the sinks 208 can convey notifications more richly than other of the sinks 208. For example, a desktop computer typically has speakers and a relatively large color display attached to it, as well as having a high bandwidth for receiving information when attached to a local network or to the Internet. Therefore, notifications can be conveyed by the desktop computer to the user in a relatively rich manner. Conversely, most cell phones have a small display that is black and white, and receive information at relatively low bandwidth. Correspondingly, the information associated with notifications conveyed by the cell phone usually must be shorter and geared towards the phone's known limitations. Thus, the content of a notification may differ depending on whether it is to be sent to a cell phone or a desktop computer. A notification sink can in one embodiment refer to that which subscribes, via an event subscription service, to events or notifications.

The notification manager 204 accesses the information stored by the user mechanism 202, and makes a decision as to which of the notifications it receives from the sources 206 to convey to which of the sinks 208 based on this information. Furthermore, the manager 204 is able to determine how the notification is to be conveyed, depending on which of the sinks 208 it has selected to send the information to. For example, it may determine that the notification should be summarized before being provided to a given of the sinks 208. The manager 204 is in one embodiment a computer program executed by a processor of a computer from a machine-readable medium such as a memory thereof.

The invention is not limited to how the manager 204 makes its decisions as to which of the notifications to convey to which of the notification sinks, and in what manner the notifications are conveyed. In one embodiment, a decision-theoretic analysis can be made. For example, the notification manager can be designed to infer important uncertainties about variables including a user's location, attention, device availability, and amount of time until the user will access the information if there were no alert. The notification manager can then make notification decisions about whether to alert a user to a notification, and if so, the nature of the summarization and the best device or devices to employ for relaying the notification. Such a particular embodiment is described in the cofiled, copending and coassigned case entitled "Decision-Theoretic Principles and Policies for Notification." Ser. No. 09/596,348 In general, the manager 204 determines the net expected value of a notification. In doing so, it can consider the following:

the fidelity and transmission reliability of each available notification sink;
the attentional cost of disturbing the user;
the novelty of the information to the user;
the time until the user will review the information on his or her own;
the potentially context-sensitive value of the information; and,
the increasing and/or decreasing value over time of the information contained within the notification.

The inferences made about uncertainties thus may be generated as expected likelihoods of values such as the cost of disruption to the user with the use of a particular mode of a particular device given some attentional state of the user, etc. The notification manager 204 makes decisions as to one or more of the following:

what the user is currently attending to and doing (based on, for example, contextual information);
where the user currently is;
how important the information is;
what is the cost of deferring the notification;
how distracting would a notification be;
what is the likelihood of getting through to the user; and,
what is the fidelity loss associated with the use of a specific mode of a given notification sink.

Therefore, ultimately, the notification manager 204 performs an analysis, such as a decision-theoretic analysis, of pending and active notifications, evaluates context-dependent variables provided by information sinks and sources, and infers key uncertainties, such as the time until a user is likely to review provided information and the user's location and current attentional state.

As used herein, inference refers generally to the process of reasoning about or inferring states of the system, environment, or user from a set of observations as captured via events and/or data. Inference can be used to identify a specific context or action, or can be employed to generate a probability distribution over states. The inference can be probabilistic—that is, the computation of a probability distribution over states of interest based on a consideration of data and events. Inference can also refer to techniques used for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, in one embodiment, the notification manager 204 accesses information stored in a user profile by the user mechanism 202 in lieu of or to support a personalized decision-theoretic analysis. For example, the user profile may indicate that at a given time, the user prefers to be notified via a pager, and only if the notification has a predetermined importance level. Such information can be used as a baseline from which to start a decision-theoretic analysis, or can be the only manner by which the manager 204 determines how and whether to notify the user.

In one embodiment of the invention, the notification platform architecture is constructed as a layer that resides over an eventing or messaging infrastructure. However, the invention is not limited to any particular eventing infrastructure. Such eventing and messaging systems and protocols include:

HyperText Transport Protocol (HTTP), or HTTP extensions as known within the art;
Simple Object Access Protocol (SOAP), as known within the art;
Windows Management Instrumentation (WMI), as known within the art;
Jini, as known within the art; and,
any type of communications protocols, such as those based on packet-switching protocols, etc.

Furthermore, in one embodiment, the architecture is constructed as a layer that resides over a flexible distributed computational infrastructure, as can be appreciated by those of ordinary skill within the art. Thus, the notification platform architecture can utilize an underlying infrastructure as a manner by which sources send notifications, alerts and events, as a manner by which sinks receive notifications, alerts and events, etc. The invention is not so limited, however.

In the following sections of the detailed description, the user mechanism 202, the notification sources 206, and the notification sinks 208 are each described in more detail, according to varying embodiments of the invention. Thereafter, a method of the manner by which the architecture operates according to an embodiment of the invention is presented.

User Mechanism

Figure 3:
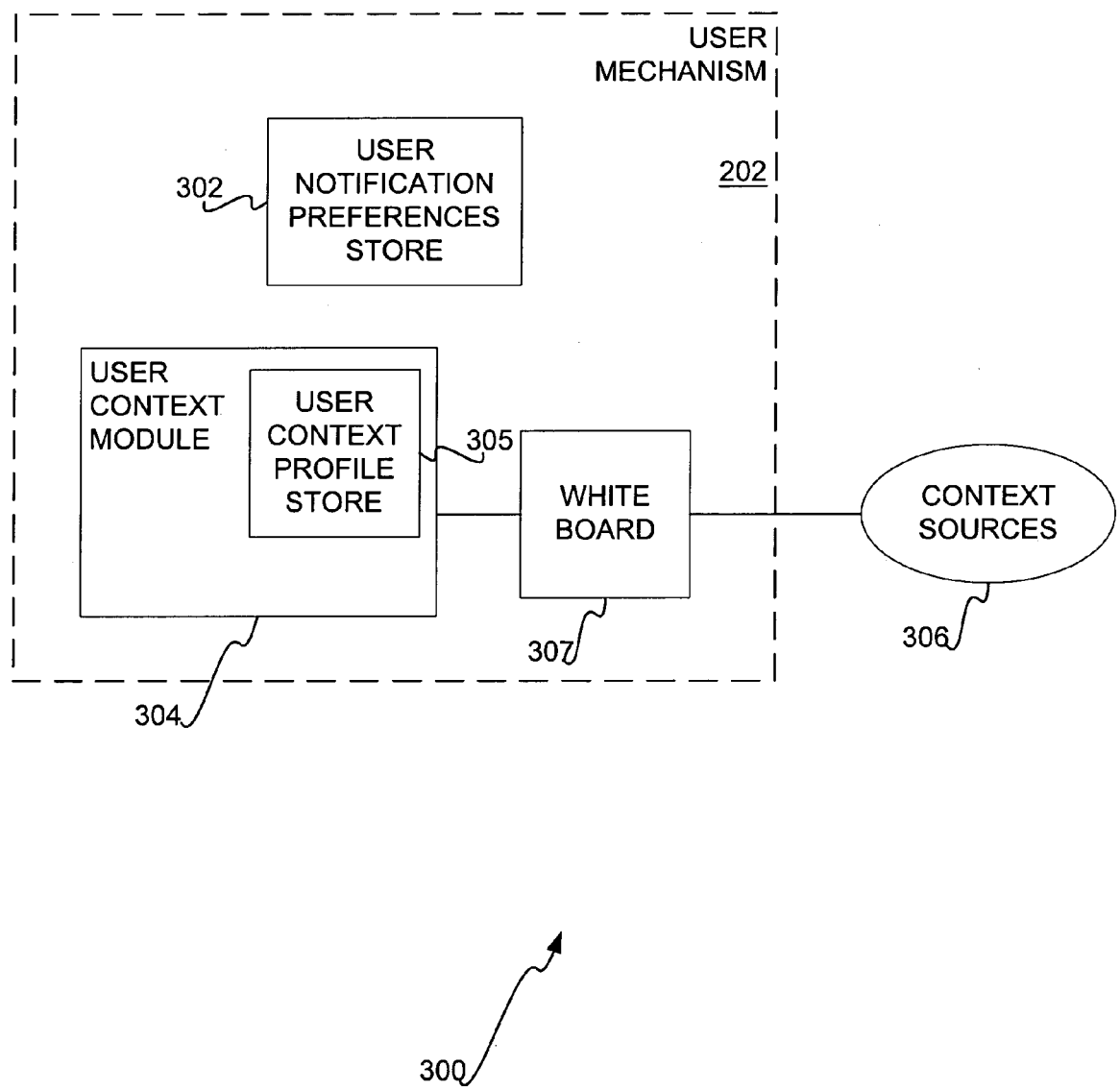
FIG. 3 is a diagram illustrating the user mechanism of the architecture of FIG. 2 in more detail, in accordance with an embodiment of the invention.

In this section of the detailed description, the user mechanism of the notification architecture described in the previous section of the detailed description is described in more detail, in conjunction with FIG. 3, which is a diagram 300 showing the user mechanism 202 of FIG. 2 in more detail. The user mechanism 202 as shown in FIG. 3 includes a user notification preferences store 302, a user context module 304 that includes a user context profile store 305, and a whiteboard 307. The user mechanism 202 is in one embodiment implemented as one or more computer programs executable by a processor of a computer from a machine-readable medium thereof, such as a memory.

The store 302 stores notification parameters for a user, such as the default notification preferences for the user, as a user profile, which can then be edited and modified by the user. The store 302 can be considered as that which stores information on parameters that influence how a user is to be notified. The user context module 304 determines a user's current context, based on the context information sources 306 as published to the whiteboard 307; the user context profile store 305 stores the context parameters for a user, such as the default context settings for the user, which can be edited and modified by the user. That is, the user context module 304 provides a best guess about current context information by accessing information from the store 305 and/or updating the prior set of beliefs in the store 305 with live sensing, via one or more context sources 306. The store 305 can be considered as that which stores a priori where a user is, and what the user is doing. The module 304 is in one embodiment implemented as a computer program executable by a processor of a computer from a machine-readable medium thereof, such as a memory.

The user context profile store 305 is a pre-assessed or predefined user profile that captures such information as a deterministic or probabilistic profile. The profile can be of typical locations, activities, device availabilities, and costs and values of different classes of notification as a function of such observations as time of day, type of day, and user interactions with one or more devices. The type of day can include weekdays, weekends, holidays, etc. The user context module 304 can then actively determine or infer key aspects of the context of the user, such as the user's current or future location and attentional state. Furthermore, the actual states of context can be accessed directly from the sources 306 via the whiteboard 307, or, can be inferred from a variety of such observations through inferential methods such as Bayesian reasoning as known within the art.

The context information sources 306 provide information to the module 304 via the whiteboard 307 regarding the user's attentional state and location, from which the module 304 can make a determination as to the user's current context (that is, the user's current attentional state and location). Furthermore, the invention is not limited to a particular number or type of context sources 306, nor the type of information inferred or accessed by the user context module. However, in one embodiment, the context sources 306 include multiple desktop information and events, such as mouse information, keyboard information, application information (e.g., which application is currently receiving the focus of the user), ambient sound and utterance information, text information in the windows on the desktop, etc. The whiteboard 307 is in one embodiment a common storage area, to which the context information sources 306 can publish information, and from which multiple components, including sources and the module 304 can access this information; it is not necessary for implementation of the invention, however. An event, also referred to as a notification or alert, can in one embodiment generally include information about an observation about one or more states of the world. Such states can include the status of system components, the activity of a user, or a measurement about the environment. Furthermore, events can be generated by an active polling of a measuring device or source of events, by the receipt of information that is sent on a change, or per a constant or varying event heartbeat.

Other types of context sources 306 include personal-information manager (PIM) information of the user, which usually can provide scheduling information regarding the schedule of the user, etc. The current time of day, as well as the user's location—for example, determined by a global positioning system (GPS), or a user's use of a cell phone, PDA, or a laptop that can be locationally determined—are also types of context sources 306. Furthermore, real-time mobile device usage is a type of context source 306. For example, a mobile device such as a cell phone may be able to determine if it is currently being used by the user, as well as its orientation and tilt (indicating information regarding its usage as well), and acceleration and speed (indicating information as to whether the user is moving or not).

Notification Sources

In this section of the detailed description, the notification sources 206 of the architecture 200 of FIG. 2 are described in more detail. The notification sources generally generate notifications that are conveyed to the notification manager, which determines when notifications should occur, and, if so, which of the notifications should be conveyed to which of the notification sinks and in what order, as has also been already described.

In one embodiment, each notification source has identified with it one or more of the following parameters within a standard description of key attributes and relationships, referred to herein as a notification source schema or source schema. It is noted that schema are provided for sources, for sinks, and for context-information sources. Such schemas provide declarative information about different component and provide a mechanism for the sources, the notification manager, the sinks, and the user mechanism (including the context mechanism described in the previous section of the detailed description) to share semantic information with one another. Thus, different schemas provide information about the nature, urgency, and device signaling modalities associated with notification. That is, schema can be defined generally as a collection of classes and relationships among classes that defines the structure of notifications and events, containing information including event or notification class, source, target, event or notification semantics, ontological content information, observational reliability, and any quality-of-service attributes.

The parameters for each notification source schema include one or more of: message class; relevance; importance; time criticality; novelty; content attributes; and fidelity tradeoffs, and source information summary information. The message class for a notification generated by a notification source indicates the type of communication of the notification, such as e-mail, instant message, numerical financial update, desktop service, etc. The relevance for a notification generated by a notification sources indicates a likelihood that the information contained within the notification is relevant, for one or more specified contexts. In one embodiment, the relevance is a logical flag, indicating whether the source is relevant for a given context or not. The novelty of the notification indicates the likelihood that the user already knows the information contained within the notification. That is, the novelty is whether the information is new to the user, over time (indicating if the user knows the information now, and when, if ever, the user will learn the information in the future without being alerted to it).

Fidelity tradeoffs associated with the notification indicate the loss of value of the information within the notification that can result from different forms of specified allowed truncation, summarization, etc. Such truncation and/or summarization may be required for the notification to be conveyed to certain types of notification sinks that may have bandwidth or other limitations preventing them from receiving the full notification as originally generated. Fidelity in general refers to the nature and/or degree of completeness of the original content associated with a notification. For example, a long e-mail message may be truncated, or otherwise summarized to the maximum of 100 characters allowed by a cell phone, incurring a loss of fidelity. Likewise, an original message containing text and graphics content suffers a loss in fidelity when transmitted via a device that only has text capabilities. In addition, a device may only be able to show a portion of the full resolution available from the source. Fidelity tradeoffs refer to a set of fidelity preferences of a source stated either in terms of orderings (e.g., rendering importance in order of graphics first, then sound) and/or costs functions that indicate how the total value of the content of the notification diminishes with changes in fidelity. For example, a fidelity tradeoff might describe how the full value associated with the transmission of a complete e-mail message changes with increasingly greater amounts of truncation. Content attributes contain a summary of the nature of the content, representing such information as whether the core message includes text, graphics, and audio components. The content itself is the actual graphics, text, and/or audio that make up the message content of the notification.

Figure 4:
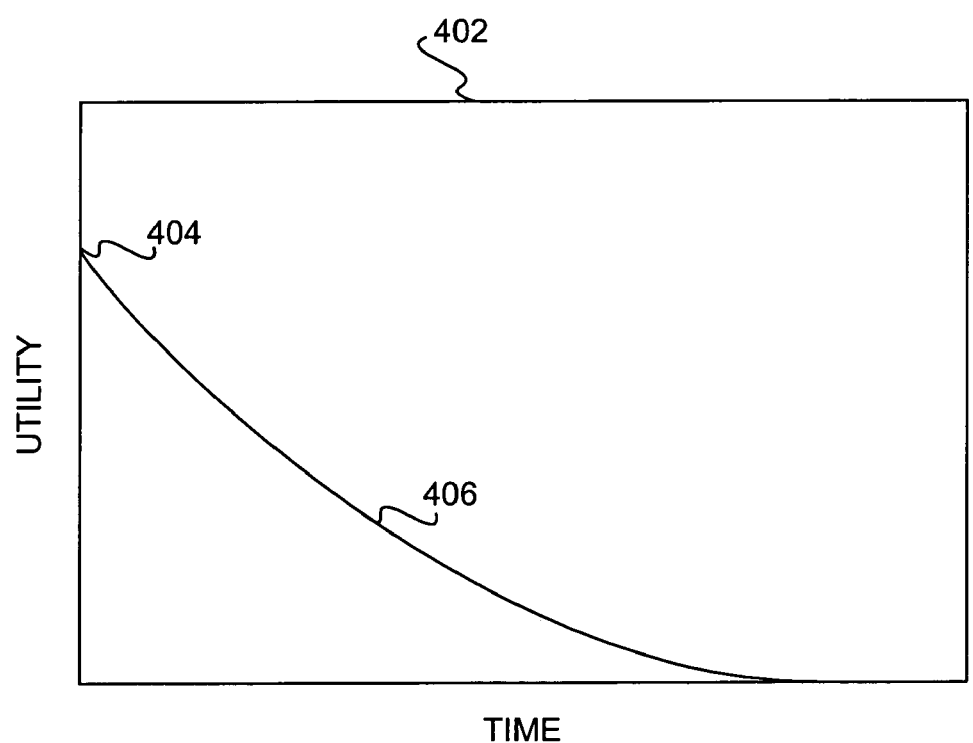
FIG. 4 is a diagram of a graph showing an example decay of the utility of information contained within a notification over time, according to an embodiment of the invention; and, FIG. 5 is a flowchart of a method according to an embodiment of the invention.

The importance of a notification refers to the value of the information contained in the notification to the user, assuming the information is relevant in the current context. In one embodiment, it is expressed as a dollar value of the information's worth to the user. Time criticality indicates the time-dependent change in the value of the information contained in the notification—that is, how the value of the information changes over time. In most but not all cases, the value of the information of a notification decays with time. This is particularly shown in the diagram 400 of FIG. 4. The graph 402 shows the utility of a notification mapped over time. At the point 404 within the graph, representing the initial time, the importance of the notification is indicated, while the curve 406 indicates the decay of the utility over time.

Default attributes and schema templates for different notification sources or source types may be made available in notification source profiles stored in the user notification preferences store, such as the store 302 of FIG. 3 as described in the previous section. Such default templates can be directed to overrule values provided by notification sources or to provide attributes when they are missing from schema provided by sources. Source summary information allows a source to post general summaries of the status of information and potential notifications available from a source. For example, source summary information from a messaging source might include information about the total number of unread messages that are at least some priority, the status of attempts by people to communicate with a user, etc.

Notification Sinks

In this section of the detailed description, the notification sinks 208 of the architecture 200 of FIG. 2 are described in more detail. The notification sinks are devices, etc., by which the user can be notified of information contained in notifications. The choice as to which sink or sinks are to be used to convey a particular notification is determined by the notification manager.

In one embodiment, each notification sink has identified with it one or more of the following parameters within a schema: device class; modes of signaling (alerting); and, for each mode, fidelity/rendering capabilities, transmission reliability, actual cost of communication, and attentional cost of disruption. For devices that allow for the parameterized control of alerting attributes, the schema for the devices can additionally include a description of the alerting attributes and parameters for controlling the attributes, and functions by which other attributes (e.g., transmission reliability, cost of distribution, etc.) change with the different settings of the alerting attributes. The schema for notification sinks provides for the manner by which the notification devices communicate semantic information about their nature and capabilities with the notification manager and other components of the system. Default attributes and schema templates for different device types can be made available in device profiles stored in the user notification preferences store, such as the store 302 of FIG. 3 as described in the previous section. Such default templates can be directed to overrule values provided by devices or to provide attributes when they are missing from schema provided by devices.

Each of the schema parameters is now described in term. The class of the device refers to the type of the device: a cell phone, a desktop computer, a laptop computer, etc. The class can also be more general, such as a mobile device, a stationery device, etc. The modes of signaling refer to the different ways in which a given device can alert the user about a notification. Devices may have one or more notification modes. For example, a cell phone can only vibrate, only ring with some volume, or it can both vibrate and ring. Furthermore, a desktop display for an alerting system can in one embodiment be decomposed into several discrete modes (e.g., a small notification window in the upper right hand of the display vs. a small thumbnail at the top of the screen—with or without an audio herald), as described in the cofiled, copending and coassigned application entitled "Display and Human-Computer Interaction for a Notification Platform." Ser. No. 09/595,401 Beyond being limited to a set of predefined behaviors, a device can allow for modes with alerting attributes that are functions of parameters, as part of its definition. Such continuous alerting parameters for a mode represent such controls as the volume at which an alert is played at the desktop, rings on a cell phone, the size of an alerting window, etc.

The transmission reliability for a mode of a notification sink indicates the likelihood that the user will receive the communicated alert about a notification, which is conveyed to the user via the sink with that mode. As transmission reliability may be dependent on the device availability and context of the user, the transmission reliability of different modes of a device can be conditioned on such contextual attributes as the location and attention of a user. Transmission reliability for each of one or more unique contextual states, defined by the cross product of such attributes as unique locations and unique attentional states, defined as disjunctions created as abstractions of such attributes (e.g., for any location away from the home, and any time period after 8 am and before noon), can also be specified. For example, depending on where the user currently is, information transmitted to a cell phone may not always reach the user, particularly if the user is in a region with intermittent coverage, or where the user would not tend to have a cell phone in this location (e.g., family holiday). Contexts can also influence transmission reliability because of the ambient noise or other masking or distracting properties of the context.

The actual cost of communication indicates the actual cost of communicating the information to the user when contained within a notification that is conveyed to the sink. For example, this cost can include the fees associated with a cell phone transmission. The cost of disruption includes the attentional costs associated with the disruption associated with the alert employed by the particular mode of a device, in a particular context. Attentional costs are typically sensitive to the specific focus of attention of the user. The fidelity/rendering capability is a description of the text, graphics, and audio/tactile capabilities of a device, also given a mode. For example, a cell phone's text limit may be 100 characters for any single message, and the phone may have no graphics abilities.

Methods

In this section of the detailed description, methods according to varying embodiments of the invention are shown. The methods can in some embodiments be computer-implemented. A computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description. The invention is not so limited, however.

Figure 5:
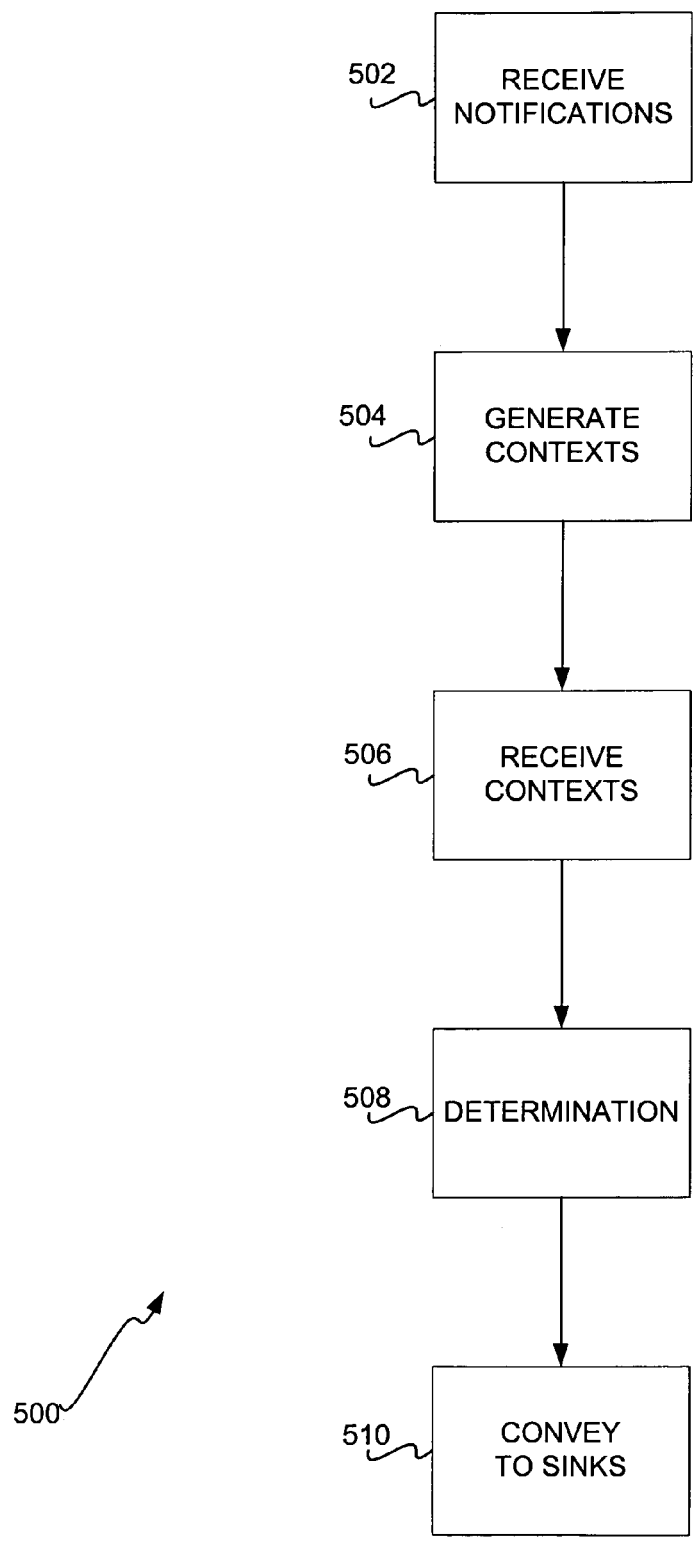

Referring to FIG. 5, a flowchart of a method 500 is shown. In one embodiment, the method 500 can be executed by the notification architecture 200 of FIG. 2, which has been already described. In 502, one or more notification sources generate notifications, which are received by a notification manager. In 504, the user mechanism generates context information regarding the user, which in 506 is received by the notification manager. That is, in one embodiment, in 504, the user mechanism accesses a user contextual information profile that indicates the user's current attentional status and location, and/or assesses real-time information regarding the user's current attentional status and location from one or more contextual information sources, as has been described in the previous sections of the detailed description.

In 508, the notification manager determines which of the notifications to convey to which of the notification sinks, based in part on the context information received from the user mechanism. The notification also makes it determination based on information regarding notification parameters of the user as stored by the user mechanism, in one embodiment. That is, in one embodiment, in 508, the manager performs a decision-theoretic analysis as to whether a user should be alerted for a given notification, and how the user should be notified. Notification parameters regarding the user can be utilized to personalize the analysis by filling in missing values or by overwriting parameters provided in the schema of sources or sinks. Notification preferences can also provide policies that are employed in lieu of the decision-theoretic analysis, as has been described in the previous sections of the detailed description. Based on this determination, the notification manager conveys the notifications to the sinks in 510.

Application of the Invention to Entities Other than Users

Embodiments of the invention have been described herein thus far as applicable to users. However, the invention itself is not so limited. That is, the invention is applicable to any type of entity, including users. Other types of entities include agents, processes, computer programs, threads, services, servers, computers, machines, companies, organizations, businesses, etc. The agent, for example, may be a software agent, which can be generally defined as a computer program that performs a background task for a user and reports to the user when the task is done or some expected event has taken place. Still other types of entities are encompassed under the invention, as can be appreciated by those of ordinary skill within the art.

Thus, where embodiments of the invention have been particularly described in relation to a user, the invention itself is applicable to any type of entity. For example, the user mechanism of a system according to an embodiment of the invention can be generalized as a mechanism, applicable to any type of entity. As another example, notification sinks can generate notifications, alerts and events regarding and for entities other than users. Similarly, notification sinks can receive notifications, alerts and events regarding and for entities other than users.

CONCLUSION

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A computerized system comprising:
   a mechanism designed to access and store information regarding context information and notification parameters, the notification parameters including at least one of a relevance parameter that indicates whether information given context thereof is relevant to a user's context, a novelty parameter that indicates whether information is new to the user, and a fidelity parameter that indicates loss of value of information due to truncation and/or summarization of the information;
   at least one notification source, each source designed to generate notifications;
   at least one notification sink, each sink designed to receive the notifications and having parameters associated with it representing at least one of:
   a) a transmission reliability of the notification sink indicating a likelihood that the user will receive information contained within a notification conveyed to the notification sink,
   b) a cost of communication of the notification sink indicating a communication cost incurred by the user when receiving information contained within a notification conveyed to the notification sink, and
   c) a cost of disruption of the notification sink indicating a disruption cost incurred by the user when receiving information contained within a notification conveyed to the notification sink; and,
   a notification manager designed to convey the notifications generated by the at least one notification source to the at least one notification sink based on the information stored in the mechanism.

2. The system of claim 1, wherein the context information and notification parameters are for an entity.

3. The system of claim 2, wherein the entity comprises one of a user, an agent, a process, a server, a computer, a machine, a company, an organization, a business, a computer program, a service, and a thread.

4. The system of claim 1, wherein the notifications generated by the at least one notification source are intended for an entity.

5. The system of claim 1, wherein the notifications received by the at least one sink are to be provided to an entity.

6. The system of claim 1, wherein the mechanism comprises a notification parameters store storing default notification preferences for an entity as a profile.

7. The system of claim 1, wherein the mechanism comprises a user mechanism.

8. The system of claim 7, wherein the user mechanism comprises a user context mechanism designed to determine a current context of the user, based on at least one context source.

9. The system of claim 8, wherein the at least one context source comprises one or more of: visual information of the user, desktop information of the user, personal-information-manager (PIM) information of the user, current time and day, mobile device usage of the user, and location of the user.

10. The system of claim 8, wherein the context mechanism is more specifically designed to determine the current context based on the at least one context source by utilizing one or more of: a statistical model, a profile, direct access of user location and activity, and real-time user specification of user state.

11. The system of claim 1, wherein the notifications generated by the at least one notification source comprises one or more of: e-mail, instant messaging, system messages, automated assistance, results from persistent, ongoing queries to one or more search facilities or services, updates to the number or content of documents available in a shared file system, updates about organizational information, information that comes available that is related to a specified content, document or topic, Internet-related information and news services, people availability, location, proximity, scheduling queries, proximities and locations of companies and organizations.

12. The system of claim 1, wherein each notification source has parameters associated with it representing at least one of:
  an importance of a current notification generated by the notification source indicating value of information contained in the current notification;
  a time criticality of the current notification generated by the notification source indicating time-dependent decay of the value of the information contained in the current notification.

13. The system of claim 1, wherein each notification source has parameters associated with it representing at least one of:
  a message class of a current notification generated by the notification source indicating a type of communication of the current notification;
  a relevance of the current notification indicating a likelihood of the relevance of information contained in the current notification;
  a novelty of the current notification indicating a likelihood of whether an entity already knows the information; and
  a fidelity of the current notification indicating a loss of value to the entity of the information upon truncation of the information.

14. The system of claim 1, wherein the at least one notification source comprises at least one of:
  a pull-type notification source; and
  a push-type notification source.

15. The system of claim 1, wherein the at least one notification sink comprises one or more of: a desktop, a cellular phone, a pager, and an automotive computerized device.

16. The system of claim 1, wherein the notification manager is more specifically designed to determine which of the notifications from the at least one notification source should be conveyed to which of the at least one notification sink, based on the information stored by the mechanism.

17. The system of claim 1, wherein the notification manager is further designed to perform a decision-theoretic analysis of the notifications from the at least one notification source based on the information stored by the mechanism to determine which of the notifications from the at least one notification source should be conveyed to which of the at least one notification sink, such that the notification manager is designed to infer encountered uncertainties.

18. A computerized system comprising:
  a user mechanism designed to store information regarding notification parameters, and comprising:
    a user notification parameters store designed to store default notification preferences for a user;
  a user context mechanism designed to determine a current context of the user, based on at least one context source;
  at least one notification source, each source designed to generate notifications intended for the user,
  at least one notification sink, each sink designed to provide the notifications to the user and having parameters associated with it representing at least one of:
    a) a transmission reliability of the notification sink indicating a likelihood that the user will receive information contained within a notification conveyed to the notification sink,
    b) a cost of communication of the notification sink indicating a communication cost incurred by the user when receiving information contained within a notification conveyed to the notification sink, and
    c) a cost of disruption of the notification sink indicating a disruption cost incurred by the user when receiving information contained within a notification conveyed to the notification sink; and,
  a notification manager designed to convey the notifications generated by the at least one notification source to the at least one notification sink based on the information stored in the user mechanism by performing a decision-theoretic analysis.

19. The system of claim 18, wherein the user context mechanism is more specifically designed to determine the current context based on the at least one context source by utilizing one or more of: a statistical model, a user profile, direct access of user location and activity, and real-time user specification of user state.

20. The system of claim 18, wherein each notification source has parameters associated with it representing at least one of:
  an importance of a current notification generated by the notification source indicating value of information contained in the current notification to the user;
  a time criticality of the current notification generated by the notification source indicating time-dependent decay of the value of the information contained in the current notification to the user;
  a message class of a current notification generated by the notification source indicating a type of communication of the current notification;
  a relevance of the current notification indicating a likelihood of the relevance of information contained in the current notification to the user;
  a novelty of the current notification indicating a likelihood of whether the user already knows the information; and,
  a fidelity of the current notification indicating a loss of value to the user of the information upon truncation of the information.

21. The system of claim 18, wherein the at least one notification source comprises at least one of: a pull-type notification source, and a push-type notification source.

22. A computerized system comprising:
  a user mechanism designed to store information regarding notification parameters of a user;
  at least one notification source, each source designed to generate notifications intended for the user, and having parameters associated with it representing at least three of:
    a) an importance of a current notification generated by the notification source indicating value of information contained in the current notification to the user;
    b) a time criticality of the current notification generated by the notification source indicating time-dependent decay of the value of the information contained in the current notification to the user;

c) a relevance of the current notification indicating a likelihood of the relevance of information contained in the current notification to the user;

d) a novelty of the current notification indicating a likelihood of whether the user already knows the information; and e) a fidelity of the current notification indicating a loss of value to the user of the information upon truncation of the information;

at least one notification sink, each sink designed to provide the notifications to the user and having parameters associated with it representing at least one of:

a) a device class of the notification sink indicating a type of device that the notification sink is;

b) a transmission reliability of the notification sink indicating a likelihood that the user will receive information contained within a notification conveyed to the notification sink, c) a cost of communication of the notification sink indicating a communication cost incurred by the user when receiving information contained within a notification conveyed to the notification sink, and d) a cost of disruption of the notification sink indicating a disruption cost incurred by the user when receiving information contained within a notification conveyed to the notification sink; and, a notification manager designed to convey the notifications generated by the at least one notification source to the at least one notification sink based on the information stored in the user mechanism.

23. The system of claim 22, wherein the user mechanism comprises:

a database storing default notification preferences for the user as a user profile; and, a context mechanism designed to determine a current context of the user, based on at least one context source.

24. The system of claim 22, wherein the notification manager is more specifically designed to determine which of the notifications from the at least one notification source should be conveyed to which of the at least one notification sink, based on the information stored by the user mechanism.

25. The system of claim 22, wherein the notification manager is further designed to perform a decision-theoretic analysis of the notifications from the at least one notification source based on the information stored by the user mechanism to determine which of the notifications from the at least one notification source should be conveyed to which of the at least one notification sink.

26. A computer-implemented method comprising:

generating one or more notifications intended for a user by one or more notification sources;

receiving the one or more notifications by a notification manager, and determining context regarding the one or more notifications;

generating contextual information by a user mechanism, the mechanism also storing information regarding notification parameters of the user;

receiving the contextual information by the notification manager;

determining which of the notifications to convey to which of one or more notification sinks by the notification manager, based on the contextual information, the context regarding the one or more notifications and the information regarding the notification parameters of the user, each notification sink having parameters associated with it representing at least one of:

a) a transmission reliability of the notification sink indicating a likelihood that the user will receive information contained within a notification conveyed to the notification sink, b) a cost of communication of the notification sink indicating a communication cost incurred by the user when receiving information contained within a notification conveyed to the notification sink, and c) a cost of disruption of the notification sink indicating a disruption cost incurred by the user when receiving information contained within a notification conveyed to the notification sink; and, conveying the which of the notifications to the which of the one or more notification sinks by the notification manager.

27. The method of claim 26, wherein generating the contextual information comprises generating the contextual information by a user context mechanism of the user mechanism.

28. A machine-readable medium having instructions stored thereon for execution by a processor of a notification manager to perform a method within the context of a notification system comprising:

receiving one or more notifications intended for a user as generated by one or more notification sources, and determining context regarding the one or more notifications;

receiving contextual information and information regarding notification parameters of the user;

determining which of the notifications to convey to which of one or more notification sinks based at least in part on the contextual information, the context regarding the one or more notifications and the information regarding the notification parameters, each notification sink having parameters associated with it representing at least one of:

a) a transmission reliability of the notification sink indicating a likelihood that the user will receive information contained within a notification conveyed to the notification sink, b) a cost of communication of the notification sink indicating a communication cost incurred by the user when receiving information contained within a notification conveyed to the notification sink, and c) a cost of disruption of the notification sink indicating a disruption cost incurred by the user when receiving information contained within a notification conveyed to the notification sink; and, conveying the which of the notifications to the which of the one or more notification sinks.

* * * * *